US010096328B1

(12) United States Patent
Markovich-Golan et al.

(10) Patent No.: US 10,096,328 B1
(45) Date of Patent: Oct. 9, 2018

(54) BEAMFORMER SYSTEM FOR TRACKING OF SPEECH AND NOISE IN A DYNAMIC ENVIRONMENT

(71) Applicant: INTEL CORPORATION, Santa Clara, CA (US)

(72) Inventors: Shmulik Markovich-Golan, Ramat Hasharon (IL); Anna Barnov, Or-Akiva (IL); Morag Agmon, Gedera (IL); Vered Bar Bracha, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/726,730

(22) Filed: Oct. 6, 2017

(51) Int. Cl.
*H04R 3/00* (2006.01)
*G10L 21/0216* (2013.01)
*H04R 1/40* (2006.01)
*H04B 15/00* (2006.01)

(52) U.S. Cl.
CPC .......... *G10L 21/0216* (2013.01); *H04R 1/406* (2013.01); *G10L 2021/02166* (2013.01)

(58) Field of Classification Search
CPC .. H04R 3/005; H04R 2430/25; H04R 25/407; H04R 1/406; G10L 2021/02166; G10L 21/0216
USPC ............................................ 381/92; 704/200
See application file for complete search history.

(56) References Cited

U.S. PATENT DOCUMENTS

2012/0082322 A1* 4/2012 van Waterschoot ...... H04S 7/30 381/92

OTHER PUBLICATIONS

Apolinario, Jr., Jose Antonio, "QRD-RLS Adaptive Filtering", Springer Science+Business Media, LLC, 2009, 359 pages.
Souden, et al., "Gaussian Model-Based Multichannel Speech Presence Probability", IEEE Transaction on Audio, Speech, and Language Processing, Jul. 2010, vol. 18, 6 pages.
Cox, H., et al., "Robust adaptive beamforming," IEEE Transactions on Acoustics, Speech and Signal Processing, Oct. 1987, vol. 35, pp. 1365-1376.
Widrow, B., et al., "Adaptive noise cancelling: Principals and applications," Proceeding of the IEEE, Dec. 1975, vol. 63, pp. 1692-1716.

(Continued)

*Primary Examiner* — Paul S Kim
*Assistant Examiner* — Ammar Hamid
(74) *Attorney, Agent, or Firm* — Finch & Maloney PLLC

(57) ABSTRACT

Techniques are provided for QR Decomposition (QRD) based minimum variance distortionless response (MVDR) adaptive beamforming. A methodology implementing the techniques according to an embodiment includes receiving signals from microphone array, identifying signal segments that include a combination of speech and noise, and identifying signal segments that include noise in the absence of speech. The method also includes calculating a QRD and an inverse QRD (IQRD) of the spatial covariance of the noise components. The method further includes estimating a relative transfer function (RTF) associated with the source of the speech, based on the noisy speech signal segments, the QRD, and the IQRD. The method further includes estimating a multichannel speech-presence-probability (SPP) on whitened input signals based on the IQRD. The method further includes calculating beamforming weights, for the microphone array, based on the RTF and the IQRD, to steer a beam in the direction associated with the speech source.

23 Claims, 7 Drawing Sheets

(56) References Cited

OTHER PUBLICATIONS

Cohen, I., "Relative transfer function identification using speech signals,"IEEE Transactions on Speech and Audio Processing, 2004, vol. 12, pp. 451-459.
Gannot, S., et al., "Signal enhancement using beamforming and nonstationarity with applications to speech", IEEE Transactions on Signal Processing, Aug. 2001, vol. 49, pp. 1614-1626.
Dvorkind, T.G., et al., "Time difference of arrival estimation of speech source in a noisy and reverberant environment," Signal Processing, 2005, vol. 85, pp. 177-204.
Markovich-Golan, S., et al., "Multichannel eigenspace beamforming in a reverberant noisy environment with multiple interferring speech signals," IEEE Transactions on Audio, Speech, and Language Processing, 2009, vol. 17, pp. 1071-1086.
Bertrand, A. and M. Moonen, "Distributed node-specific lcmv beamforming in wireless sensor networks", IEEE Transactions on Signal Processing, 2012, vol. 60, pp. 233-246.
Doclo, S. and M. Moonen, "Multimicrophone noise reduction using recursive gsvd-based optimal filtering with anc postprocessing stage," IEEE transactions on Speech and Audio Processing, 2005, vol. 13, pp. 53-69.

* cited by examiner

BEAMFORMER SYSTEM FOR TRACKING OF SPEECH AND NOISE IN A DYNAMIC ENVIRONMENT

BACKGROUND

Audio and speech processing techniques are being used in a growing number of application areas including, for example, speech recognition, voice-over-IP, and cellular communications. Methods for speech enhancement are often desired to mitigate the effects of noisy and dynamic environments that can be associated with these applications. The deployment of microphone arrays is becoming more common with advancements in technology, enabling the use of multichannel processing and beamforming techniques to improve signal quality. These multichannel processing techniques, however, can be computationally expensive.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
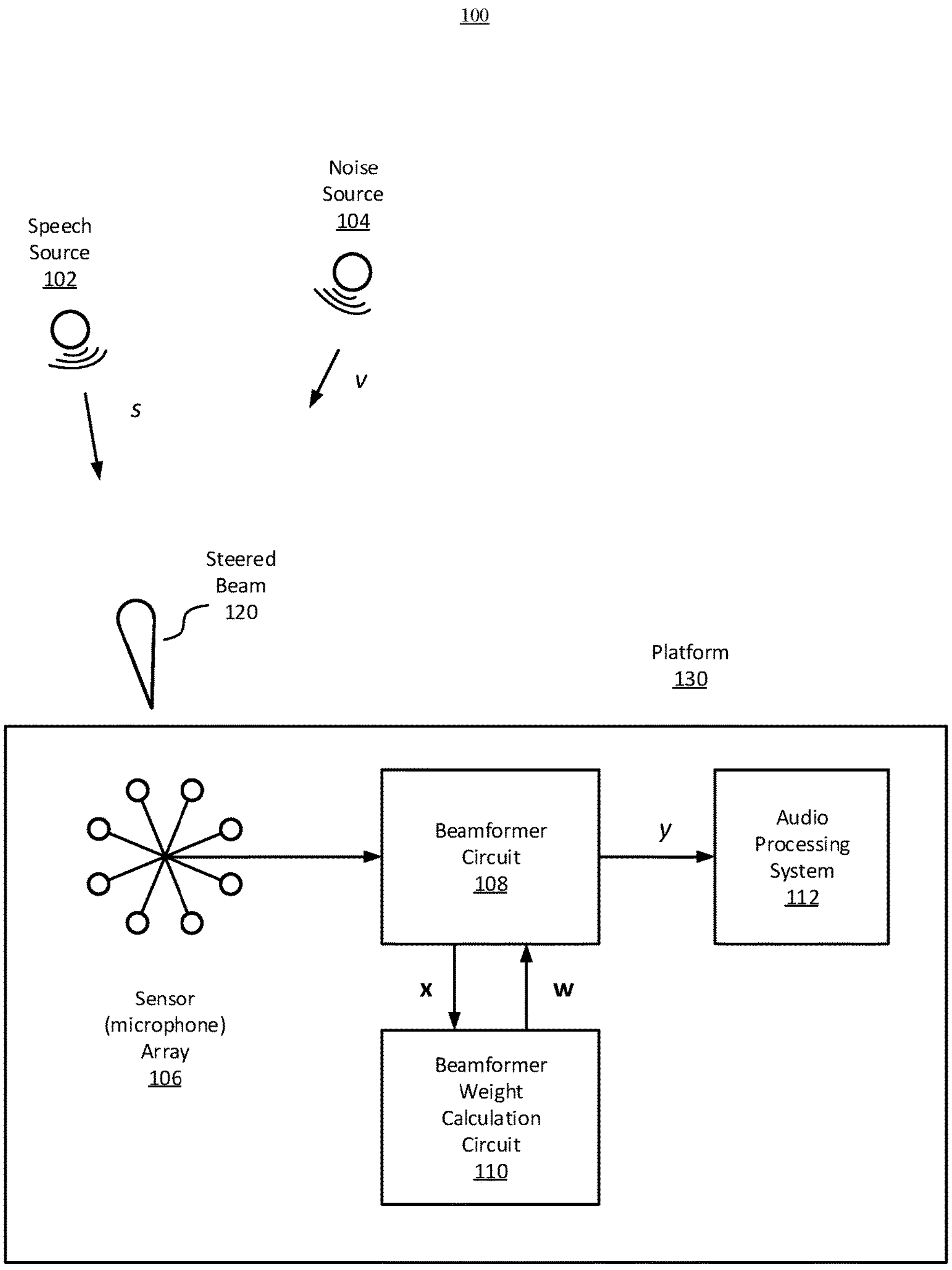
FIG. 1 is a top-level block diagram of an adaptive beamforming system deployment, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for adaptive acoustic beamforming in a dynamic environment, where a speaker of interest, noise sources, and the microphone array may all (or some subset thereof) be in motion relative to one another. Beamforming weights are calculated and updated, with improved efficiency, using a QR Decomposition (QRD) based minimum variance distortionless response (MVDR) process. The application of these beamforming weights to the microphone array enables a beam to be steered so that the moving speech source (and/or noise sources, as the case may be) can be tracked, resulting in improved quality of the received speech signal, in the presence of noise. As will be appreciated, a QR decomposition (sometimes referred to as QR factorization) generally refers to the decomposition of a given matrix into a product QR, where Q represents an orthogonal matrix and R represents a right triangular matrix.

The disclosed techniques can be implemented, for example, in a computing system or a software product executable or otherwise controllable by such systems, although other embodiments will be apparent. The system or product is configured to perform QR based MVDR acoustic beamforming. In accordance with an embodiment, a methodology to implement these techniques includes receiving audio signals from an array of microphones, identifying signal segments that include a combination of speech and noise, and identifying other signal segments that include noise in the absence of speech. The identification is based on a multichannel speech-presence-probability (SPP) model using whitened input signals. The method also includes calculating a QRD and an inverse QRD (IQRD) of a spatial covariance matrix generated from the speech-free noise segments. The method further includes estimating a relative transfer function (RTF) associated with the source of the speech. The RTF calculation is based on the noisy speech signal segments and on the QRD and the IQRD, as will be described in greater detail below. The method further includes calculating beamforming weights for the microphone array, the calculation based on the RTF and the IQRD, to steer a beam in the direction associated with the source of the speech.

As will be appreciated, the techniques described herein may allow for improved acoustic beamforming with relatively fast and efficient tracking of a speech or noise source, without degradation of noise reduction capabilities, compared to existing methods that can introduce noise bursts into speech segments during highly dynamic scenarios. The disclosed techniques can be implemented on a broad range of platforms including laptops, tablets, smart phones, workstations, personal computers, and speaker phones, for example. These techniques may further be implemented in hardware or software or a combination thereof.

FIG. 1 is a top-level block diagram 100 of a deployment of an adaptive beamforming system/platform, configured in accordance with certain embodiments of the present disclosure. A platform 130, such as for example a communications or computing platform, is shown to include a sensor array 106, a beamformer circuit 108, a beamformer weight calculation circuit 110, and an audio processing system 112. In some embodiments, the sensor array 106 comprises a number (M) of microphones laid out in a selected pattern. Also shown are a speaker (or speech source) 102 and noise sources 104. Additionally, a generated beam 120 is illustrated as being steered in the direction of the speech source 102, while its nulls are steered towards the noise sources. The beam results from the application of calculated beamformer weights w, as will be described in greater detail below.

In general, one or more of the speech source 102, the noise sources 104, and the platform 130 (or the sensor array 106) may be in motion relative to one another. At a high level, the sensor array 106 receives acoustic signals $x_1(n)$, . . . $x_M(n)$, through the M microphones, where n denotes the discrete time index. Each received signal includes a combination of the speech source signal s(n), which has been modified by an acoustic transfer function resulting from its transmission through the environment to the microphone, and the noise signal v(n). The symbol x(n)

is a vector representation of the signals $x_1(n), \ldots x_M(n)$. The received signal x(n) can be expressed as $$x(n)=h(n)*s(n)+v(n)$$

where h(n) is a vector of the acoustic impulse responses $h_1(n), \ldots h_M(n)$, associated with transmission to each of the M microphones and the * operator indicates convolution.

Beamformer weight calculation circuit 110 is configured to efficiently calculate (and update) weights w(n) from current and previous received signals x(n), using a QRD based MVDR process, as will be described in greater detail below. The beamforming filters, w(n), are calculated in the Fourier transform domain and denoted as w(k), M dimensional vectors with complex-valued elements, $w_1(k), \ldots w_M(k)$. These beamforming filters scale and phase shift the signals from each of the microphones. Beamformer circuit 108 is configured to apply those weights to the signals received from each of the microphones, to generate a signal y(k) which is an estimate of the speech signal s(k) through the steered beam 120. The application of beamforming weights has the effect of focusing the array 106 on the current position of the speech source 102 and reducing the impacts of the noise sources 104. The signal estimate y(k) is transformed back to the time-domain using an inverse short time Fourier transform (ISTFT) and may then be provided to an audio processing system 112 which can be configured to perform speech recognition and act in some desired manner based on the speech content of signal estimate y(n).

Figure 2:
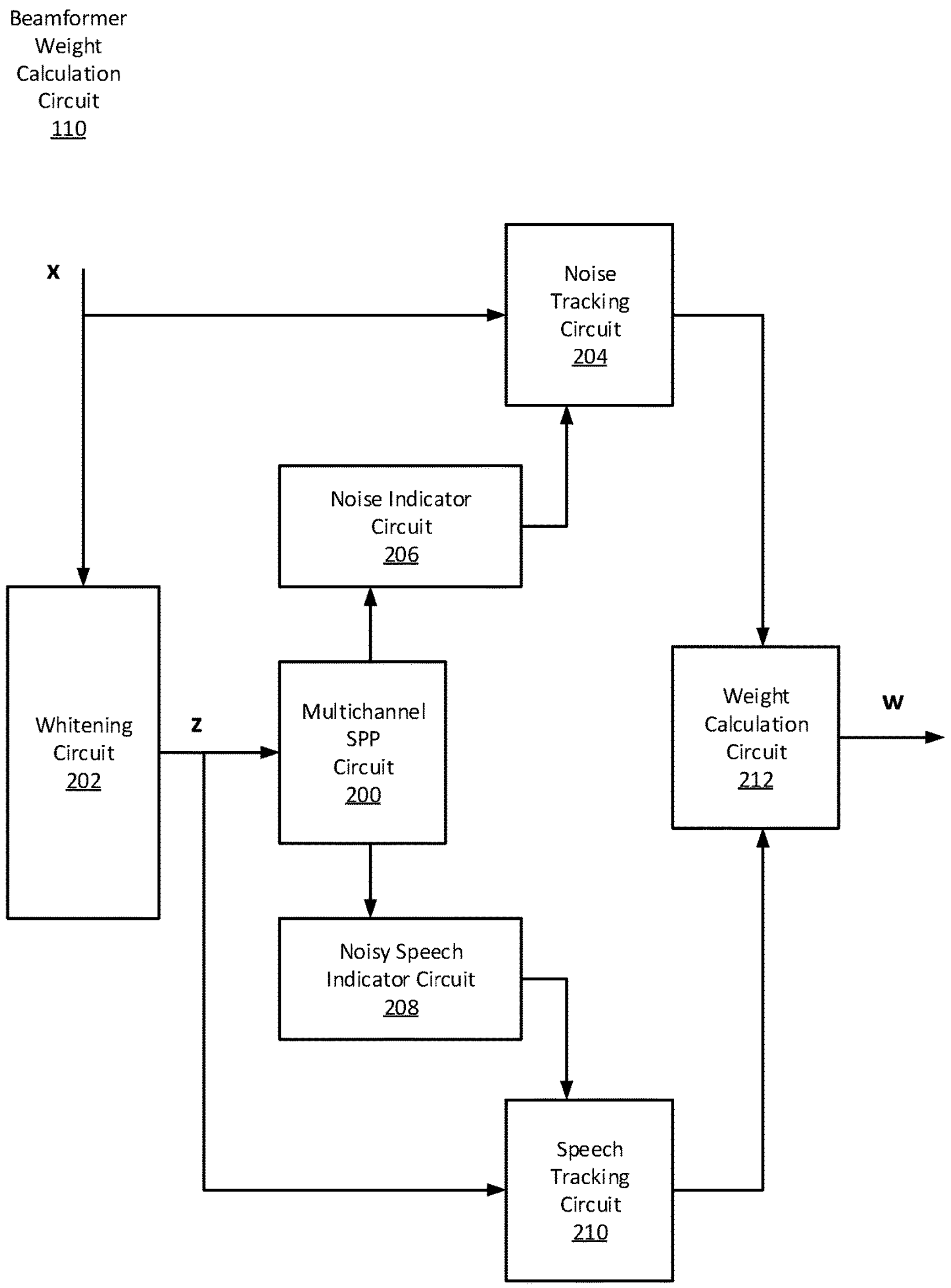
FIG. 2 is a block diagram of a beamformer weight calculation circuit, configured in accordance with certain embodiments of the present disclosure.

FIG. 2 is a block diagram of a beamformer weight calculation circuit 110, configured in accordance with certain embodiments of the present disclosure. The beamformer weight calculation circuit 110 is shown to include a whitening circuit 202, a multichannel SPP circuit 200, a noise tracking circuit 204, a speech tracking circuit 210, a noise indicator circuit 206, a noisy speech indicator circuit 208, and a weight calculation circuit 212.

The audio signals received from the microphones are transformed to the short time Fourier transform (STFT) domain (by STFT circuit 510 described in connection with FIG. 5 below). In the STFT domain, the input signals can now be expressed as $$x(l,k)=h(l,k)s(l,k)+v(l,k)$$

where l is a time index and k is a frequency bin index. The resulting signal estimate, after beamforming, can be expressed using similar notation as $$y(l,k)=w^H(l,k)x(l,k)$$

where $(\square)^H$ denotes the conjugate-transpose operation.

The calculation of weights w is described now with reference to the whitening circuit 202, multichannel SPP circuit 200, noise tracking circuit 204, speech tracking circuit 210, noise indicator circuit 206, noisy speech indicator circuit 208, and weight calculation circuit 212.

Whitening circuit 202 is configured to calculate a whitened multi-channel signal z in which the noise component v in x is transformed by $S^{-H}$ into a spatially white noise component with unit variance:

$$z(l,k)\triangleq S^{-H}(l,k)x(l,k)$$

Figure 3:
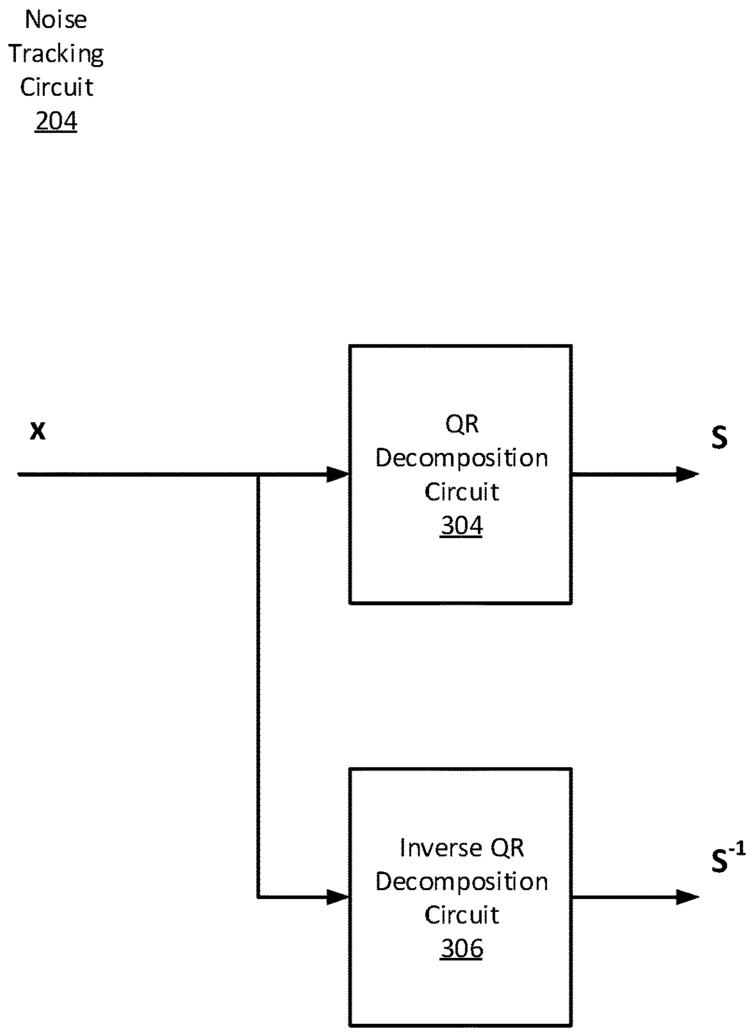
FIG. 3 is a block diagram of a noise tracking circuit, configured in accordance with certain embodiments of the present disclosure.

Noise tracking circuit 204 is configured to track the noise source component of the received signals over time. With reference now to FIG. 3, noise tracking circuit 204 is shown to include a QR decomposition circuit 304, and an inverse QR decomposition circuit 306.

QR decomposition (QRD) circuit 304 is configured to calculate the matrix decomposition of a spatial covariance matrix $\Phi_{vv}$ of the noise components, into its square root matrices S and $S^H$ from the input signal x:

$$S(l,k),S^H(l,k)\leftarrow \mathrm{QRD}(x(l,k))$$

Inverse QR decomposition (IQRD) circuit 306 is configured to calculate the matrix decomposition of $\varphi_{vv}$ to its inverse square root matrices $S^{-1}$ and $S^{-H}$:

$$S^{-1}(l,k),S^{-H}(l,k)\leftarrow \mathrm{IQRD}(x(l,k))$$

In some embodiments, the QRD and IQRD calculations may be performed using a Cholesky decomposition, or other known techniques in light of the present disclosure, which can be efficiently performed with a computational complexity on the order of $M^2$.

Figure 4:
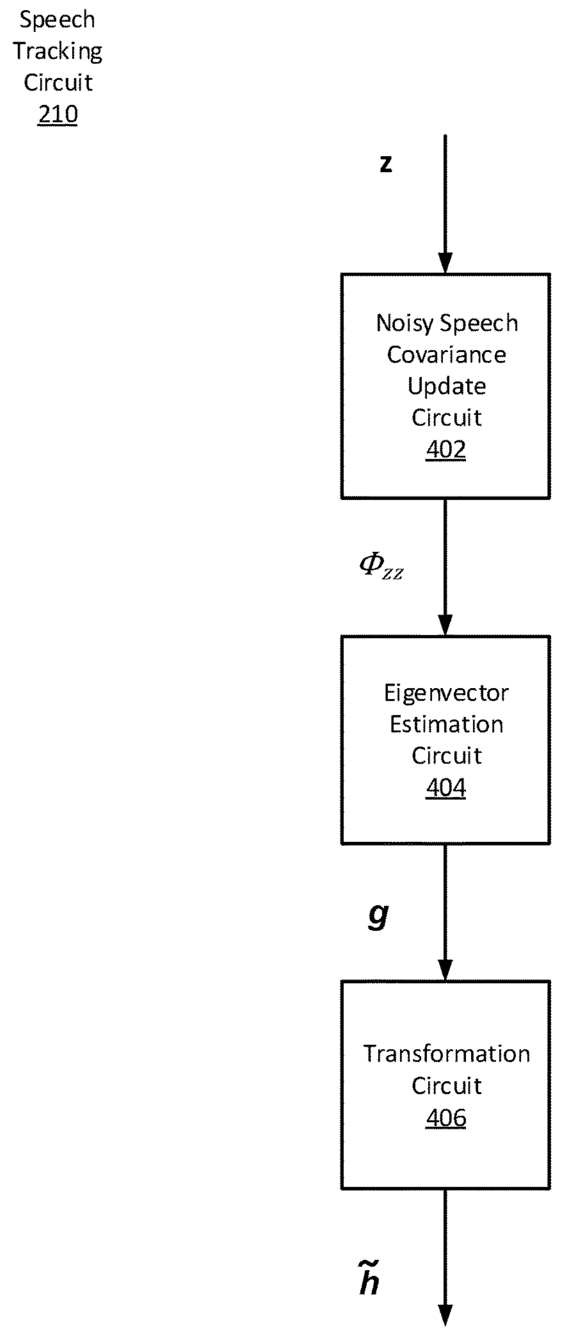
FIG. 4 is a block diagram of a speech tracking circuit, configured in accordance with certain embodiments of the present disclosure.

Returning now to FIG. 2, speech tracking circuit 210 is configured to estimate the relative transfer function (RTF) associated with the speech source signal. The estimation is based on segments of the received audio signal that have been identified as containing both speech and noise signal (as will be described later), and on S and $S^{-1}$ as calculated above. With reference to FIG. 4, speech tracking circuit 210 is shown to include a noisy speech covariance update circuit 402, eigenvector estimation circuit 404, and transformation circuit 406. Noisy speech covariance update circuit 402 is configured to calculate a spatial covariance matrix $\Phi_{zz}$ based on segments of the whitened audio signal z that have been identified as containing both speech and noise. The spatial covariance matrix of z is then calculated and updated over time using the recursive averaging process with selected memory decay factor λ:

$$\Phi_{zz}(l,k)=\lambda\Phi_{zz}(l-1,k)+(1-\lambda)z(l,k)z^H(l,k)$$

Continuing with reference to FIG. 4, eigenvector estimation circuit 404 is configured to estimate an eigenvector g associated with the direction of the source of the speech signal. The estimation is based on $\Phi_{zz}$ as follows.

$$\tilde{\Phi}_{zz} = \Phi_{zz} - I$$

$$e_m \triangleq [0_{1\times(m-1)}, 1, 0_{1\times(M-m)}]^T$$

$$\rho = \frac{(\tilde{\Phi}_{zz}e_1)^H}{\|\tilde{\Phi}_{zz}e_1\|}\tilde{\Phi}_{zz}$$

$$g = \frac{1}{M}\sum_{m=1}^{M}\frac{1}{\rho_m}\tilde{\Phi}_{zz}e_m$$

where I is the identity matrix, $e_m$ is a selection vector that extracts the m-th column of an M×M matrix for m=1, . . . , M, and ρ is a scale factor to align the amplitudes and phases of the columns of $\Phi_{zz}-I$.

Transformation circuit 406 is configured to generate the RTF estimate $\tilde{h}$ by transforming the eigenvector g back to the domain of the microphone array and normalizing it to the reference microphone as follows:

$$\tilde{h}(l,k) = \frac{S^H(l,k)g(l,k)}{e_1^T S^H(l,k)g(l,k)}$$

Returning to FIG. 2, noise indicator circuit 206 is configured to identify segments of the received audio signals (time and frequency bins) that include noise in the absence of speech. Noisy speech indicator circuit 208 is configured to identify segments that include a combination of noise and speech. These indicators provide a trigger to update the beamformer weights. The indicators are based on inputs from a multichannel speech presence probability model which is calculated by multichannel SPP circuit 200.

Multichannel SPP circuit 200 is configured to calculate a speech probability that incorporates both spatial coherence and signal-to-noise ratio. The calculations, which are described below, reuse previously computed terms (e.g., z) for increased efficiency.

The following calculations are performed to determine the generalized likelihood ratio μ:

$$\xi \triangleq Tr(\Phi_{zz}) - M$$

$$\beta \triangleq z^H \Phi_{zz} z - \|z\|^2$$

$$\mu \triangleq \frac{1-q}{q}\frac{1}{1+\xi}\exp\left(\frac{\beta}{1+\xi}\right)$$

where Tr is the matrix trace operation and q is an apriori (known or estimated) speech absence probability. A speech presence probability p is then calculated as:

$$p = \frac{\mu}{1+\mu}$$

Noise indicator circuit 206 marks the signal segment as noise in the absence of speech if $$p \le \tau_v$$

and noisy speech indicator circuit 208 marks the signal segment as a combination of noise and speech if $$p \le \tau_s$$

where $\tau_v$ and $\tau_s$ are predefined noise and noisy speech confidence thresholds, respectively, for the speech presence probability.

Returning to FIG. 2, weight calculation circuit 212 is configured to calculate the beamforming weights based on a multiplicative product of the estimated RTF, h, and both the IQRD $S^{-1}$ and its conjugate transpose $S^{-H}$ as follows:

$$b = S^{-H}\tilde{h}$$

$$w = \frac{S^{-1}b}{\|b\|^2}$$

The beamforming weights w are calculated to steer a beam of the array of microphones in a direction associated with the source of the speech signal and a null in the direction of the noise source.

Figure 5:
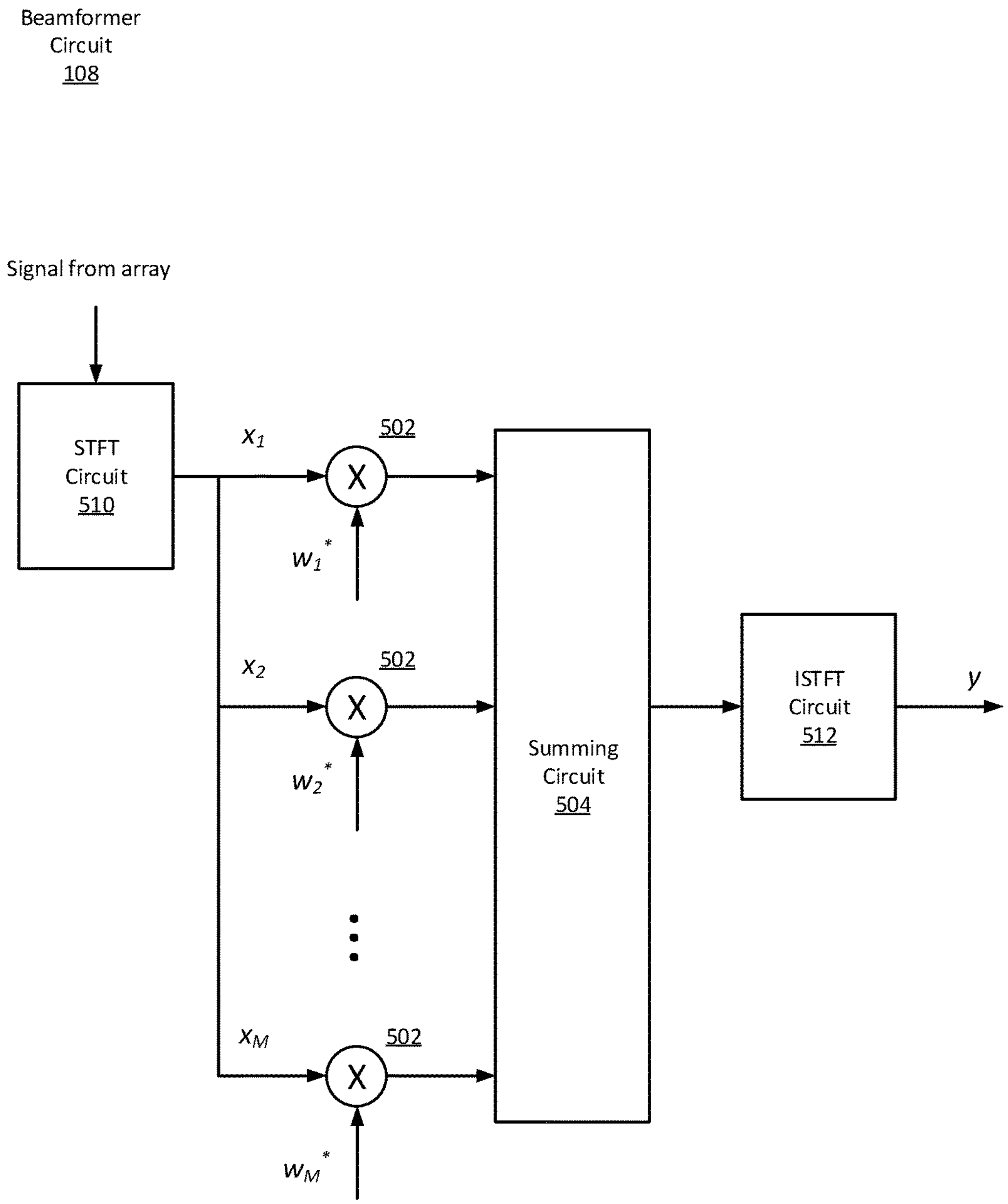
FIG. 5 is a block diagram of a beamformer circuit, configured in accordance with certain embodiments of the present disclosure.

FIG. 5 is a block diagram of a beamformer circuit 108, configured in accordance with certain embodiments of the present disclosure. The beamforming circuit 108 is shown to include STFT transformation circuit 510, ISTFT transformation circuit 512, multiplier circuits 502, and a summing circuit 504. Multiplier circuits 502 are configured to apply the complex conjugated weights of $w_1, \ldots w_M$ to the STFT transformed received signals $x_1, \ldots x_M$. Summing circuit 504 is configured to sum the weighted signals. The resulting summed weighted signals, after transformation back to the time domain, provide an estimate y of the speech signal s through the steered beam 120:

$$y(n) = \mathrm{ISTFT}(w^H(l,k)x(l,k))$$

Methodology

Figure 6:
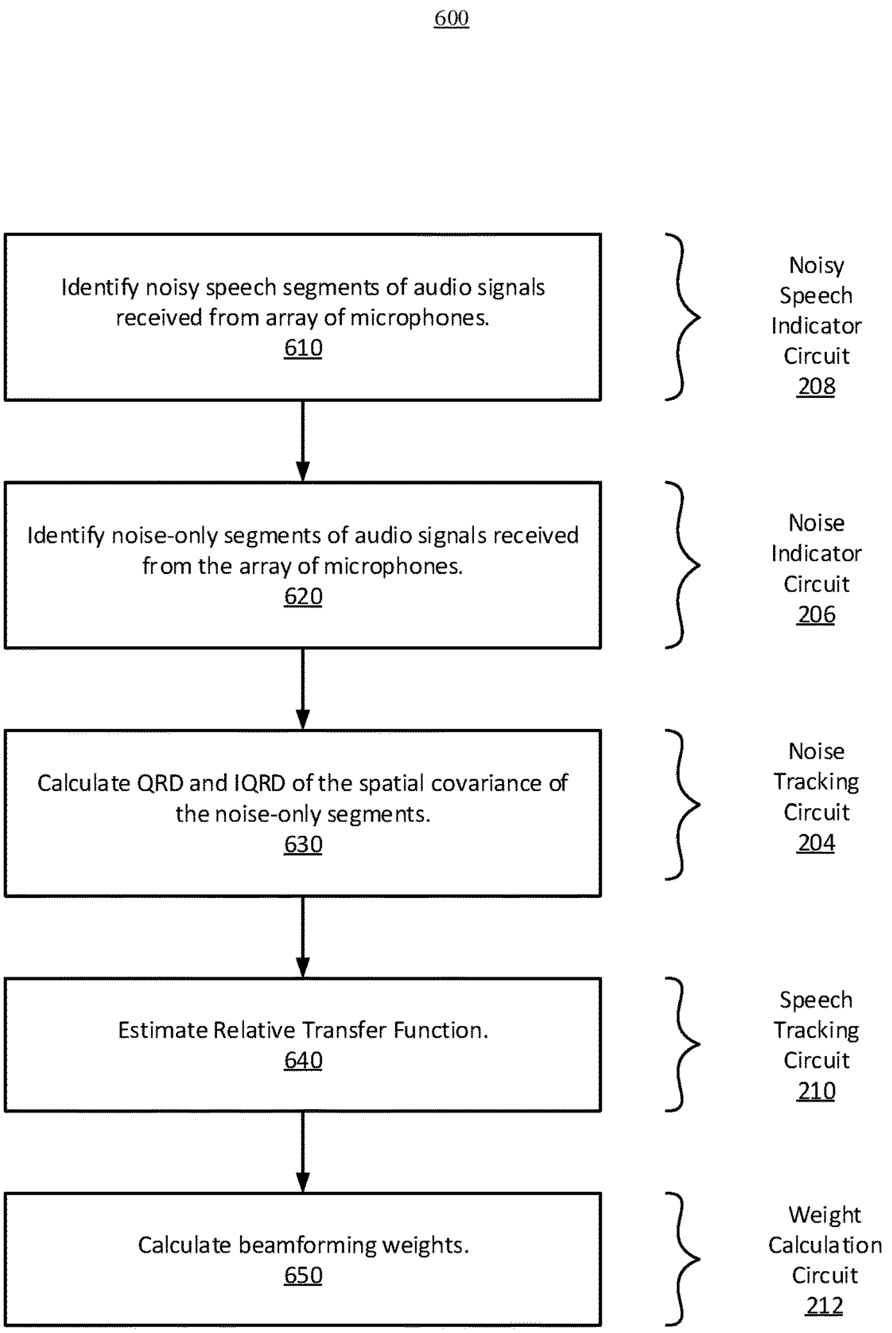
FIG. 6 is a flowchart illustrating a methodology for acoustic beamforming, in accordance with certain embodiments of the present disclosure.

FIG. 6 is a flowchart illustrating an example method 600 for QRD-MVDR based adaptive acoustic beamforming, in accordance with certain embodiments of the present disclosure. As can be seen, the example method includes a number of phases and sub-processes, the sequence of which may vary from one embodiment to another. However, when considered in the aggregate, these phases and sub-processes form a process for acoustic beamforming in accordance with certain of the embodiments disclosed herein. These embodiments can be implemented, for example using the system architecture illustrated in FIGS. 1-5, as described above. However other system architectures can be used in other embodiments, as will be apparent in light of this disclosure. To this end, the correlation of the various functions shown in FIG. 6 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 600. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 6, in an embodiment, method 600 for adaptive beamforming commences, at operation 610, by receiving audio signals from an array of microphones and identifying segments of those audio signals that include a combination of speech and noise (e.g., noisy speech segments). Next, at operation 620, a second set of segments of the audio signals is identified, the second set of segments including noise in the absence of speech (e.g., noise-only segments).

At operation 630, calculations are performed to generate a QR decomposition (QRD) and an inverse QR decomposition (IQRD) of the spatial covariance of the noise-only segments. In some embodiments, the QRD and the IQRD may be calculated using a Cholesky decomposition.

At operation 640, a relative transfer function (RTF), associated with the speech signal of the noisy speech segments, is estimated. The estimation is based on the noisy speech segments, the QRD, and the IQRD.

At operation 650, a set of beamforming weights are calculated based on a multiplicative product of the estimated RTF and the IQRD. The beamforming weights are configured to steer a beam of the array of microphones in a direction of the source of the speech signal. In some embodiments, the source of the speech signal may be in motion relative to the array of microphones, and the beam may be steered dynamically to track the moving speech signal source.

Of course, in some embodiments, additional operations may be performed, as previously described in connection with the system. For example, the audio signals received from the array of microphones are transformed into the frequency domain, for example using a Fourier transform. In some embodiments, the identification of the noisy speech segments and the noise-only speech segments may be based on a generalized likelihood ratio calculation.

Example System

Figure 7:
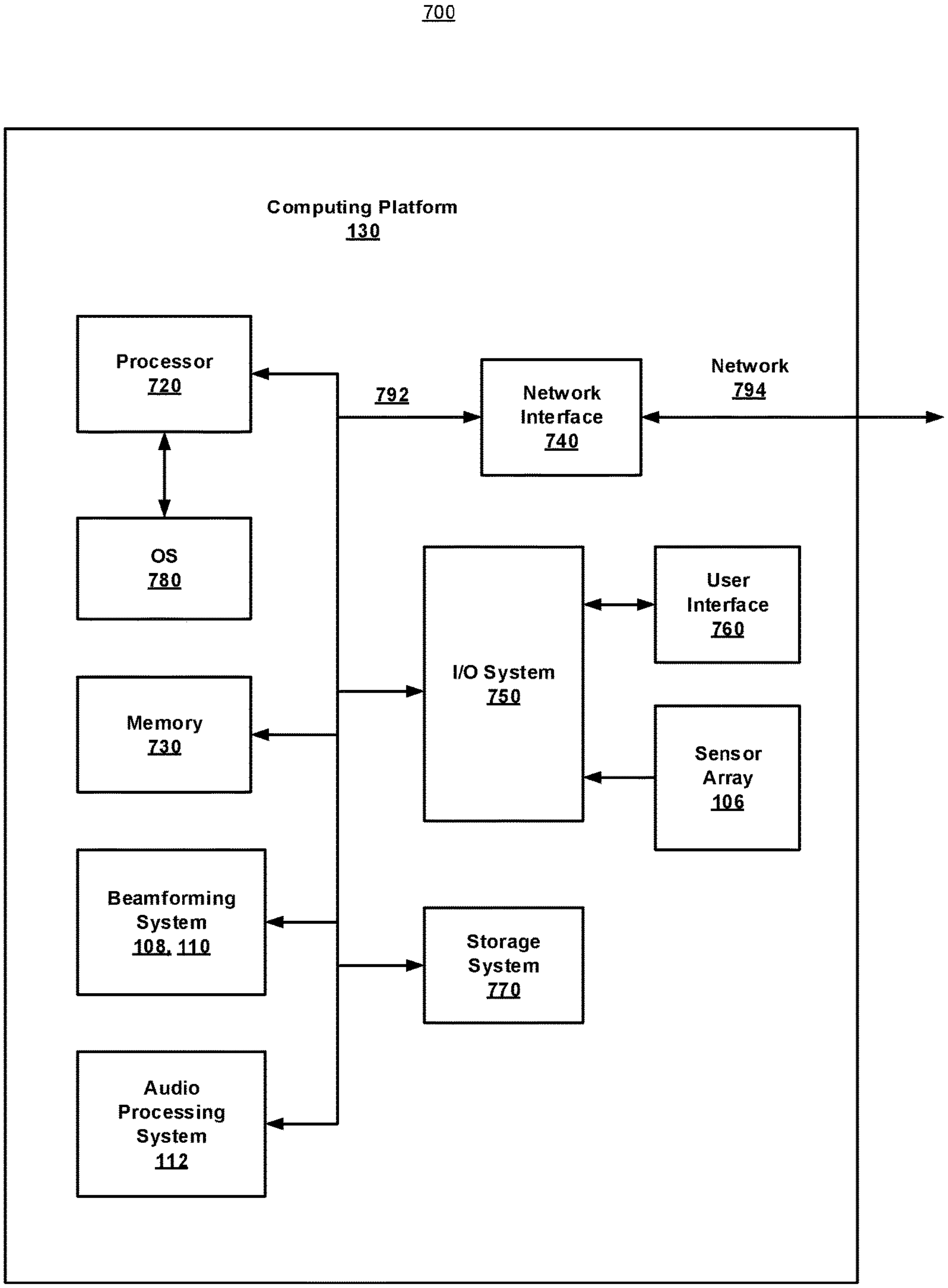
FIG. 7 is a block diagram schematically illustrating a computing platform configured to perform acoustic beamforming, in accordance with certain embodiments of the present disclosure.

FIG. 7 illustrates an example system 700 to perform QRD-MVDR based adaptive acoustic beamforming, configured in accordance with certain embodiments of the present disclosure. In some embodiments, system 700 comprises a platform 130 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), speaker phone, teleconferencing system, messaging device, data communication device, camera, imaging device, and so forth. Any combination of different devices may be used in certain embodiments.

In some embodiments, platform 130 may comprise any combination of a processor 720, a memory 730, beamforming system 108, 110, audio processing system 112, a network interface 740, an input/output (I/O) system 750, a user interface 760, a sensor (microphone) array 106, and a storage system 770. As can be further seen, a bus and/or interconnect 792 is also provided to allow for communication between the various components listed above and/or other components not shown. Platform 130 can be coupled to a network 794 through network interface 740 to allow for communications with other computing devices, platforms, or resources. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as a graphics processing unit, an audio processor, or hardware accelerator, to assist in control and processing operations associated with system 700. In some embodiments, the processor 720 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or a reduced instruction set computer (RISC) processor. In some embodiments, processor 720 may be configured as an x86 instruction set compatible processor.

Memory 730 can be implemented using any suitable type of digital storage including, for example, flash memory and/or random access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 700, and therefore may also be implemented using any suitable existing or subsequently-developed platform.

Network interface circuit 740 can be any appropriate network chip or chipset which allows for wired and/or wireless connection between other components of computer system 700 and/or network 794, thereby enabling system 700 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of computer system 700. I/O devices may include, but not be limited to, user interface 760 and sensor array 106 (e.g., an array of microphones). User interface 760 may include devices (not shown) such as a display element, touchpad, keyboard, mouse, and speaker, etc. I/O system 750 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 130.

It will be appreciated that in some embodiments, the various components of the system 700 may be combined or integrated in a system-on-a-chip (SoC) architecture. In some embodiments, the components may be hardware components, firmware components, software components or any suitable combination of hardware, firmware or software.

Beamforming system 108, 110 is configured to perform QRD-MVDR based adaptive acoustic beamforming, as described previously. Beamforming system 108, 110 may include any or all of the circuits/components illustrated in FIGS. 1-6, including beamformer circuit 108 and beamformer weight calculation circuit 110, as described above. These components can be implemented or otherwise used in conjunction with a variety of suitable software and/or hardware that is coupled to or that otherwise forms a part of platform 130. These components can additionally or alternatively be implemented or otherwise used in conjunction with user I/O devices that are capable of providing information to, and receiving information and commands from, a user.

In some embodiments, these circuits may be installed local to system 700, as shown in the example embodiment of FIG. 7. Alternatively, system 700 can be implemented in a client-server arrangement wherein at least some functionality associated with these circuits is provided to system 700 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 794 or remotely coupled to network 794 by one or more other networks and/or communication channels. In some cases, access to resources on a given network or computing system may require credentials such as usernames, passwords, and/or compliance with any other suitable security mechanism.

In various embodiments, system 700 may be implemented as a wireless system, a wired system, or a combination of both. When implemented as a wireless system, system 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the beamforming methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. In other embodiments, the functionalities disclosed herein can be incorporated into other software applications, such as, for example, audio and video conferencing applications, robotic applications, smart home applications, and fitness applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform methods and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for audio beamforming, the method comprising: identifying, by a processor-based system, a first set of segments of a plurality of audio signals received from an array of one or more microphones, the first set of segments comprising a combination of a speech signal and a noise signal; identifying, by the processor-based system, a second set of segments of the plurality of audio signals, the second set of segments comprising the noise signal; calculating, by the processor-based system, a QR decomposition (QRD) of a spatial covariance matrix, and an inverse QR decomposition (IQRD) of the spatial covariance matrix, the spatial covariance matrix based on the second set of identified segments; estimating, by the processor-based system, a relative transfer function (RTF) associated with the speech signal of the first set of identified segments, the estimation based on the first set of identified segments, the QRD, and the IQRD; and calculating, by the processor-based system, a plurality of beamforming weights based on a multiplicative product of the estimated RTF and the IQRD, the beamforming weights to steer a beam of the array of microphones in a direction associated with a source of the speech signal.

Example 2 includes the subject matter of Example 1, further comprising transforming the plurality of audio signals to the frequency domain, using a Fourier transform.

Example 3 includes the subject matter of Examples 1 or 2, wherein the calculated beamforming weights are to steer a beam of the array of microphones to track motion of the source of the speech signal relative to the array of microphones.

Example 4 includes the subject matter of any of Examples 1-3, wherein the QRD and the IQRD are calculated using a Cholesky decomposition.

Example 5 includes the subject matter of any of Examples 1-4, further comprising updating the spatial covariance matrix based on a recursive average of previously calculated spatial covariance matrices.

Example 6 includes the subject matter of any of Examples 1-5, wherein the RTF estimation further comprises: calculating a spatial covariance matrix based on the identified first set of segments; estimating an eigenvector associated with the direction of the source of the speech signal, the eigenvector estimation based on the calculated spatial covariance matrix based on the identified first set of segments; and normalizing the estimated eigenvector to a selected reference microphone of the array of microphones.

Example 7 includes the subject matter of any of Examples 1-6, wherein the identifying of the first set of segments and the second set of segments, of the plurality of audio signals, is based on a generalized likelihood ratio calculation.

Example 8 includes the subject matter of any of Examples 1-7, further comprising applying the calculated beamforming weights as scale factors to the plurality of audio signals received from the array of microphones and summing the scaled audio signals to generate an estimate of the speech signal.

Example 9 is a system for audio beamforming, the system comprising: a noisy speech indicator circuit to identify a first set of segments of a plurality of audio signals received from an array of microphones, the first set of segments comprising a combination of a speech signal and a noise signal; a noise indicator circuit to identify a second set of segments of the plurality of audio signals, the second set of segments comprising the noise signal; a noise tracking circuit to calculate a QR decomposition (QRD) of a spatial covariance matrix, and to calculate an inverse QR decomposition (IQRD) of the spatial covariance matrix, the spatial covariance matrix based on the second set of identified segments; a speech tracking circuit to estimate a relative transfer function (RTF) associated with the speech signal of the first set of identified segments, the estimation based on the first set of identified segments, the QRD, and the IQRD; and a weight calculation circuit to calculate a plurality of beamforming weights based on a multiplicative product of the estimated RTF and the IQRD, the beamforming weights to steer a beam of the array of microphones in a direction associated with a source of the speech signal.

Example 10 includes the subject matter of Example 9, further comprising a STFT circuit to transform the plurality of audio signals to the frequency domain, using a Fourier transform.

Example 11 includes the subject matter of Examples 9 or 10, wherein the noise tracking circuit further comprises a QR decomposition circuit to calculate the QRD using a Cholesky decomposition, and an inverse QR decomposition circuit to calculate the IQRD using the Cholesky decomposition.

Example 12 includes the subject matter of any of Examples 9-11, wherein the speech tracking circuit further comprises: a noisy speech covariance update circuit to calculate a spatial covariance matrix based on the identified first set of segments; an eigenvector estimation circuit to estimate an eigenvector associated with the direction of the source of the speech signal, the eigenvector estimation based on the calculated spatial covariance matrix based on the identified first set of segments; and a scaling and transformation circuit to normalize the estimated eigenvector to a selected reference microphone of the array of microphones.

Example 13 includes the subject matter of any of Examples 9-12, wherein the identifying of the first set of segments and the second set of segments, of the plurality of audio signals, is based on a generalized likelihood ratio calculation.

Example 14 includes the subject matter of any of Examples 9-13, further comprising a beamformer circuit to apply the calculated beamforming weights as scale factors to the plurality of audio signals received from the array of microphones and summing the scaled audio signals to generate an estimate of the speech signal.

Example 15 includes the subject matter of any of Examples 9-14, wherein the calculated beamforming weights are to steer a beam of the array of microphones to track motion of the source of the speech signal relative to the array of microphones.

Example 16 is at least one non-transitory computer readable storage medium having instructions encoded thereon that, when executed by one or more processors, result in the following operations for audio beamforming, the operations comprising: identifying a first set of segments of a plurality of audio signals received from an array of microphones, the first set of segments comprising a combination of a speech signal and a noise signal; identifying a second set of segments of the plurality of audio signals, the second set of segments comprising the noise signal; calculating a QR decomposition (QRD) of a spatial covariance matrix, and an inverse QR decomposition (IQRD) of the spatial covariance matrix, the spatial covariance matrix based on the second set of identified segments; estimating a relative transfer function (RTF) associated with the speech signal of the first set of identified segments, the estimation based on the first set of identified segments, the QRD, and the IQRD; and calculating a plurality of beamforming weights based on a multiplicative product of the estimated RTF and the IQRD, the beamforming weights to steer a beam of the array of microphones in a direction associated with a source of the speech signal.

Example 17 includes the subject matter of Example 16, further comprising the operation of pre-processing the plurality of audio signals to transform the audio signals to the frequency domain, the pre-processing including performing a Fourier transform on the audio signals.

Example 18 includes the subject matter of Examples 16 or 17, wherein the calculated beamforming weights are to steer a beam of the array of microphones to track motion of the source of the speech signal relative to the array of microphones.

Example 19 includes the subject matter of any of Examples 16-18, wherein the QRD and the IQRD are calculated using a Cholesky decomposition.

Example 20 includes the subject matter of any of Examples 16-19, further comprising the operation of updating the spatial covariance matrix based on a recursive average of previously calculated spatial covariance matrices.

Example 21 includes the subject matter of any of Examples 16-20, wherein the RTF estimation further comprises the operations of: calculating a spatial covariance matrix based on the identified first set of segments; estimating an eigenvector associated with the direction of the source of the speech signal, the eigenvector estimation based on the calculated spatial covariance matrix based on the identified first set of segments; and normalizing the estimated eigenvector to a selected reference microphone of the array of microphones.

Example 22 includes the subject matter of any of Examples 16-21, wherein the identifying of the first set of segments and the second set of segments, of the plurality of audio signals, is based on a generalized likelihood ratio calculation.

Example 23 includes the subject matter of any of Examples 16-22, further comprising the operations of applying the calculated beamforming weights as scale factors to the plurality of audio signals received from the array of microphones and summing the scaled audio signals to generate an estimate of the speech signal.

Example 24 is a system for audio beamforming, the system comprising: means for identifying a first set of segments of a plurality of audio signals received from an array of one or more microphones, the first set of segments comprising a combination of a speech signal and a noise signal; means for identifying a second set of segments of the plurality of audio signals, the second set of segments comprising the noise signal; means for calculating a QR decomposition (QRD) of a spatial covariance matrix, and an inverse QR decomposition (IQRD) of the spatial covariance matrix, the spatial covariance matrix based on the second set of identified segments; means for estimating a relative transfer function (RTF) associated with the speech signal of the first set of identified segments, the estimation based on the first set of identified segments, the QRD, and the IQRD; and means for calculating a plurality of beamforming weights based on a multiplicative product of the estimated RTF and the IQRD, the beamforming weights to steer a beam of the array of microphones in a direction associated with a source of the speech signal.

Example 25 includes the subject matter of Example 24, further comprising means for transforming the plurality of audio signals to the frequency domain, using a Fourier transform.

Example 26 includes the subject matter of Examples 24 or 25, wherein the calculated beamforming weights are to steer a beam of the array of microphones to track motion of the source of the speech signal relative to the array of microphones.

Example 27 includes the subject matter of any of Examples 24-26, wherein the QRD and the IQRD are calculated using a Cholesky decomposition.

Example 28 includes the subject matter of any of Examples 24-27, further comprising means for updating the spatial covariance matrix based on a recursive average of previously calculated spatial covariance matrices.

Example 29 includes the subject matter of any of Examples 24-28, wherein the RTF estimation further comprises: means for calculating a spatial covariance matrix based on the identified first set of segments; means for estimating an eigenvector associated with the direction of the source of the speech signal, the eigenvector estimation based on the calculated spatial covariance matrix based on the identified first set of segments; and means for normalizing the estimated eigenvector to a selected reference microphone of the array of microphones.

Example 30 includes the subject matter of any of Examples 24-29, wherein the identifying of the first set of segments and the second set of segments, of the plurality of audio signals, is based on a generalized likelihood ratio calculation.

Example 31 includes the subject matter of any of Examples 24-30, further comprising means for applying the calculated beamforming weights as scale factors to the plurality of audio signals received from the array of microphones and summing the scaled audio signals to generate an estimate of the speech signal.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for audio beamforming, the method comprising:

identifying, by a processor-based system, a first set of segments of a plurality of audio signals received from an array of one or more microphones, the first set of segments comprising a combination of a speech signal and a noise signal;

identifying, by the processor-based system, a second set of segments of the plurality of audio signals, the second set of segments comprising the noise signal;

calculating, by the processor-based system, a QR decomposition (QRD) of a spatial covariance matrix, and an inverse QR decomposition (IQRD) of the spatial covariance matrix, the spatial covariance matrix based on the second set of identified segments;

estimating, by the processor-based system, a relative transfer function (RTF) associated with the speech signal of the first set of identified segments, the estimation based on the first set of identified segments, the QRD, and the IQRD; and calculating, by the processor-based system, a plurality of beamforming weights based on a multiplicative product of the estimated RTF and the IQRD, the beamforming weights to steer a beam of the array of microphones in a direction associated with a source of the speech signal.

2. The method of claim 1, further comprising transforming the plurality of audio signals to the frequency domain, using a Fourier transform.

3. The method of claim 1, wherein the calculated beamforming weights are to steer a beam of the array of microphones to track motion of the source of the speech signal relative to the array of microphones.

4. The method of claim 1, wherein the QRD and the IQRD are calculated using a Cholesky decomposition.

5. The method of claim 1, further comprising updating the spatial covariance matrix based on a recursive average of previously calculated spatial covariance matrices.

6. The method of claim 1, wherein the RTF estimation further comprises:

calculating a spatial covariance matrix based on the identified first set of segments;

estimating an eigenvector associated with the direction of the source of the speech signal, the eigenvector estimation based on the calculated spatial covariance matrix based on the identified first set of segments; and normalizing the estimated eigenvector to a selected reference microphone of the array of microphones.

7. The method of claim 1, wherein the identifying of the first set of segments and the second set of segments, of the plurality of audio signals, is based on a generalized likelihood ratio calculation.

8. The method of claim 1, further comprising applying the calculated beamforming weights as scale factors to the plurality of audio signals received from the array of microphones and summing the scaled audio signals to generate an estimate of the speech signal.

9. A system for audio beamforming, the system comprising:

a noisy speech indicator circuit to identify a first set of segments of a plurality of audio signals received from an array of microphones, the first set of segments comprising a combination of a speech signal and a noise signal;

a noise indicator circuit to identify a second set of segments of the plurality of audio signals, the second set of segments comprising the noise signal;

a noise tracking circuit to calculate a QR decomposition (QRD) of a spatial covariance matrix, and to calculate an inverse QR decomposition (IQRD) of the spatial covariance matrix, the spatial covariance matrix based on the second set of identified segments;

a speech tracking circuit to estimate a relative transfer function (RTF) associated with the speech signal of the first set of identified segments, the estimation based on the first set of identified segments, the QRD, and the IQRD; and a weight calculation circuit to calculate a plurality of beamforming weights based on a multiplicative product of the estimated RTF and the IQRD, the beamforming weights to steer a beam of the array of microphones in a direction associated with a source of the speech signal.

10. The system of claim 9, further comprising a STFT circuit to transform the plurality of audio signals to the frequency domain, using a Fourier transform.

11. The system of claim 9, wherein the noise tracking circuit further comprises a QR decomposition circuit to calculate the QRD using a Cholesky decomposition, and an inverse QR decomposition circuit to calculate the IQRD using the Cholesky decomposition.

12. The system of claim 9, wherein the speech tracking circuit further comprises:

a noisy speech covariance update circuit to calculate a spatial covariance matrix based on the identified first set of segments;

an eigenvector estimation circuit to estimate an eigenvector associated with the direction of the source of the speech signal, the eigenvector estimation based on the calculated spatial covariance matrix based on the identified first set of segments; and a scaling and transformation circuit to normalize the estimated eigenvector to a selected reference microphone of the array of microphones.

13. The system of claim 9, wherein the identifying of the first set of segments and the second set of segments, of the plurality of audio signals, is based on a generalized likelihood ratio calculation.

14. The system of claim 9, further comprising a beamformer circuit to apply the calculated beamforming weights as scale factors to the plurality of audio signals received from the array of microphones and summing the scaled audio signals to generate an estimate of the speech signal.

15. The system of claim 9, wherein the calculated beamforming weights are to steer a beam of the array of microphones to track motion of the source of the speech signal relative to the array of microphones.

16. At least one non-transitory computer readable storage medium having instructions encoded thereon that, when executed by one or more processors, result in the following operations for audio beamforming, the operations comprising:

identifying a first set of segments of a plurality of audio signals received from an array of microphones, the first set of segments comprising a combination of a speech signal and a noise signal;

identifying a second set of segments of the plurality of audio signals, the second set of segments comprising the noise signal;

calculating a QR decomposition (QRD) of a spatial covariance matrix, and an inverse QR decomposition (IQRD) of the spatial covariance matrix, the spatial covariance matrix based on the second set of identified segments;

estimating a relative transfer function (RTF) associated with the speech signal of the first set of identified segments, the estimation based on the first set of identified segments, the QRD, and the IQRD; and calculating a plurality of beamforming weights based on a multiplicative product of the estimated RTF and the IQRD, the beamforming weights to steer a beam of the array of microphones in a direction associated with a source of the speech signal.

17. The computer readable storage medium of claim 16, further comprising the operation of pre-processing the plurality of audio signals to transform the audio signals to the frequency domain, the pre-processing including performing a Fourier transform on the audio signals.

18. The computer readable storage medium of claim 16, wherein the calculated beamforming weights are to steer a beam of the array of microphones to track motion of the source of the speech signal relative to the array of microphones.

19. The computer readable storage medium of claim 16, wherein the QRD and the IQRD are calculated using a Cholesky decomposition.

20. The computer readable storage medium of claim 16, further comprising the operation of updating the spatial covariance matrix based on a recursive average of previously calculated spatial covariance matrices.

21. The computer readable storage medium of claim 16, wherein the RTF estimation further comprises the operations of:

calculating a spatial covariance matrix based on the identified first set of segments;

estimating an eigenvector associated with the direction of the source of the speech signal, the eigenvector estimation based on the calculated spatial covariance matrix based on the identified first set of segments; and normalizing the estimated eigenvector to a selected reference microphone of the array of microphones.

22. The computer readable storage medium of claim 16, wherein the identifying of the first set of segments and the second set of segments, of the plurality of audio signals, is based on a generalized likelihood ratio calculation.

23. The computer readable storage medium of claim 16, further comprising the operations of applying the calculated beamforming weights as scale factors to the plurality of audio signals received from the array of microphones and summing the scaled audio signals to generate an estimate of the speech signal.

* * * * *